(12) United States Patent
Tebaibi et al.

(10) Patent No.: US 12,399,575 B2
(45) Date of Patent: Aug. 26, 2025

(54) DISPLAY SYSTEM FOR A VEHICLE AND METHOD FOR OPTICALLY HIGHLIGHTING DIFFERENT OPERATING STATES IN THE VEHICLE

(71) Applicant: Volkswagen Aktiengesellschaft, Wolfsburg (DE)

(72) Inventors: Yannis Tebaibi, Braunschweig (DE); Christoph Boese, Wolfenbüttel (DE); Heino Wengelnik, Wolfsburg (DE); Alexander Kunze, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 18/292,306

(22) PCT Filed: Aug. 1, 2022

(86) PCT No.: PCT/EP2022/071529
§ 371 (c)(1),
(2) Date: Jan. 25, 2024

(87) PCT Pub. No.: WO2023/012097
PCT Pub. Date: Feb. 9, 2023

(65) Prior Publication Data
US 2024/0220028 A1 Jul. 4, 2024

(30) Foreign Application Priority Data
Aug. 4, 2021 (DE) .................. 102021208436.2

(51) Int. Cl.
*G06F 3/02* (2006.01)
*B60K 35/22* (2024.01)
*B60K 35/29* (2024.01)
*G06F 3/14* (2006.01)

(52) U.S. Cl.
CPC .............. *G06F 3/02* (2013.01); *B60K 35/22* (2024.01); *B60K 35/29* (2024.01); *G06F 3/1423* (2013.01);
(Continued)

(58) Field of Classification Search
CPC ......... G06F 3/02; G06F 3/1423; B60K 35/29; B60K 35/22; B60K 2360/191; B60K 2360/182
See application file for complete search history.

(56) References Cited

U.S. PATENT DOCUMENTS

| | | | |
|---|---|---|---|
| 6,223,103 B1 * | 4/2001 | Patil | B60K 35/81 701/28 |
| 11,360,576 B1 * | 6/2022 | Rakshit | G06F 3/1423 |

(Continued)

FOREIGN PATENT DOCUMENTS

| | | |
|---|---|---|
| DE | 102009036371 A1 | 4/2011 |
| DE | 102010047778 A1 | 4/2012 |

(Continued)

OTHER PUBLICATIONS

PCT/EP2022/071529. International Search Report (Nov. 11, 2022). Corresponding German Application No. 102021208436.2. Examination Report (Feb. 6, 2025).

*Primary Examiner* — Sejoon Ahn
(74) *Attorney, Agent, or Firm* — Peter Zura; LOZA & LOZA, LLP (57) ABSTRACT

Technologies and techniques relating to a display system for a vehicle, including a first display for displaying information at a first location in the vehicle, a second display for displaying information at a second location in the vehicle remote from the first location, an operating unit for manual operation of the first display and the second display, a switching apparatus for switching between two operating states, an indicating apparatus for creating visually percep- (Continued)

tible indications in the respective operating states, and an actuation apparatus for optically highlighting the first operating state and the second operating state by optically changing the first indication in the first operating state and/or the second indication in the second operating state by manual actuation of the actuation apparatus.

20 Claims, 5 Drawing Sheets

(52) U.S. Cl.
CPC .. *B60K 2360/182* (2024.01); *B60K 2360/191* (2024.01)

(56) References Cited

U.S. PATENT DOCUMENTS

| | | | | |
|---|---|---|---|---|
| 11,893,174 | B1* | 2/2024 | Wong | G06F 3/038 |
| 2013/0205258 | A1* | 8/2013 | Ecker | G06F 3/0482 |
| | | | | 715/822 |
| 2017/0269704 | A1 | 9/2017 | Akita et al. | |
| 2022/0185113 | A1* | 6/2022 | Nix | B60K 35/00 |
| 2022/0185178 | A1* | 6/2022 | Sudo | B60K 35/00 |
| 2022/0185182 | A1* | 6/2022 | Jung | B60K 35/00 |
| 2022/0185306 | A1* | 6/2022 | Yeom | B60K 35/00 |
| 2022/0391158 | A1* | 12/2022 | Lemmens | G06F 3/1438 |
| 2023/0333645 | A1* | 10/2023 | Palangie | G06F 3/03547 |

FOREIGN PATENT DOCUMENTS

| | | |
|---|---|---|
| DE | 102010048746 A1 | 4/2012 |
| DE | 102013006496 A1 | 10/2014 |
| DE | 102016218006 A1 | 3/2018 |
| DE | 102017110787 A1 | 11/2018 |
| DE | 102019119135 A1 | 1/2021 |
| EP | 3243688 A1 | 11/1987 |
| EP | 3421285 A1 | 6/1989 |

* cited by examiner

DISPLAY SYSTEM FOR A VEHICLE AND METHOD FOR OPTICALLY HIGHLIGHTING DIFFERENT OPERATING STATES IN THE VEHICLE

RELATED APPLICATIONS

The present application claims priority to International Patent Application No. PCT/EP2022/071529 to Tebaibi et al., filed Aug. 1, 2022, titled "Display System For A Vehicle And Method For Optically Highlighting Different Operating States In The Vehicle," which claims priority to German Pat. App. No. DE 10 2021 208 436.2, filed Aug. 4, 2021, to Tebaibi et al., the contents of each being incorporated by reference in their entirety herein.

TECHNICAL FIELD

The present disclosure relates to a display system for a vehicle for displaying different operating and driving parameters of the vehicle on different display means. The present disclosure furthermore relates to a vehicle comprising such a display system and to a method for optically highlighting different operating states in such a display system. The present disclosure additionally relates to a tangibly-embodied computer program product for carrying out such a method and to a memory means on which such a computer program product is stored.

BACKGROUND

Modern vehicle cockpits offer a plurality of display and operating options. Relative to the driver's direct line of sight, head-up displays are increasingly installed together with instrument clusters. The installation of head-up displays offers advantages with respect to ergonomics and driving safety. For example, head-up displays allow critical information to be perceived without the driver averting his or her gaze and with little accommodation originating from the driving scene. Instrument clusters, in contrast, offer advantages when it comes to representing complex contents, such as 3D maps or media. In addition, it is not possible to ensure that legally relevant information is permanently visible using head-up displays alone since the contrast values are dependent on the relative ambient brightness as well as other factors, such as the wearing of polarized sunglasses. The characteristic advantages of the two-display means result in the requirement as well as the customer need for the respective suitable functions to be represented and operated in both displays. Since the display means do not form a cohesive surface area, it is necessary to switch between the display means, that is, to switch between a first operating state for operating a first display means and a further operating state for operating a further display means. Various approaches are known in the prior art in this regard.

In some vehicles, it is possible to switch between the possible operating states in the menu of a central display and operating unit, which is usually arranged in the area of a center console of the vehicle. Such a solution, however, is cumbersome for the driver and not suited for use while driving. In addition, solutions are known in which it is possible to switch between the different operating states by way of an operating unit at the steering wheel. The German patent application DE 10 2019 119 135 A1, for example, describes a system for using a rocker switch of a steering wheel for switching between operating targets, such as an instrument cluster and a head-up display. It is furthermore described that the assignment of an operating element to a particular operating target or display means can be clarified by the output of a respective corresponding visual, acoustic and/or haptic indication in the vehicle. The visual indication can, in particular, be implemented by the output of a so-called operating focus in the associated display means. In particular, the operating focus can always be displayed in the operating target that can presently be operated by means of the operating unit. The operating focus can be implemented by means of a change in color and/or a change in brightness and/or a change in contrast of parts, or the entire content, of the display of the particular assigned operating target. Moreover, the operating focus can be used by showing a symbol, showing a frame and/or outputting a text in the display.

A number of approaches for highlighting the presently active display means are thus already known from the prior art. The challenge with representing a suitable operating focus or a suitable indication for highlighting the presently active display means is thus to find a suitable compromise between perceptibility by the user and the interference factor, in particular for the driver. If the indication represented is too large and/or conspicuous, this may distract the driver from the driving process. If the indication represented is too small and/or inconspicuous, the indication may possibly not be recognized well, or only while distracting the driver from the driving process, since the driver has to search for it. In a head-up display, additional displays should be avoided, or minimized, to as great an extent as possible due to occlusion and contrast limitations.

SUMMARY

Aspects of the present disclosure are directed to addressing at least some of the above-described problem. In some aspects, methods and systems are disclosed for perceptibly highlighting a present operating state, wherein sufficiently good perceptibility can be achieved with a minimized amount of distraction from the driving process.

Some aspects are disclosed in the subject matter of the independent claims, provided below. Other aspects are disclosed in the dependent claims, the description and the figures. It is understood that features that are described in connection with the display system also apply in connection with the disclosed vehicle, computer program product, and the memory means disclosed herein, and vice versa, so that mutual reference is made, and/or can be made, in each case to the individual aspects of the invention with respect to the disclosure.

In some examples, a display system for a vehicle is disclosed. The display system comprises a first display apparatus (also referred to as "means") for displaying information at a first location in the vehicle, and a second display means for displaying information at a second location, which is situated away from the first location, in the vehicle. The display system furthermore comprises an operating unit for manually operating the first display and the second display, wherein the operating unit comprises a switching apparatus for switching between a first operating state, in which the operating unit is configured for the manual operation of the first display, and a second operating state, in which the operating unit is configured for the manual operation of the second display. The display means may further include an indicating means for creating a visually perceptible first indication on the first display to indicate the first operating state and for creating a visually perceptible second indication on the second display to indicate the second operating state. The operating unit may further include an actuator for optically highlighting the first operating state and the second operating state by optically changing the first indication in the first operating state and/or the second indication in the second operating state by the manual actuation of the actuator.

In some examples, a vehicle is disclosed, comprising a steering wheel and a display system, as described above, wherein the operating unit and/or the actuating means ("actuator") are installed at the steering wheel. Such a vehicle is preferably configured in the form of a road vehicle, such as a passenger car or a truck. Nonetheless, the vehicle can also be configured as a rail vehicle, an aircraft, a watercraft or a robot. In some examples, a method is disclosed for optically highlighting different operating states in a display system, as described above, of a vehicle. The method may include switching between the first operating state and the second operating state to create a visually perceptible first indication on the first display to indicate the first operating state or a visually perceptible second indication on the second display to indicate the second operating state. The method may further include optically changing the first indication in the first operating state to optically highlight the first operating state, or optically changing the second indication in the second operating state to optically highlight the second operating state.

The vehicle and the method according to the present disclosure thus offer the same advantages as those that were described in detail with respect to the display system disclosed herein.

In some examples, a computer program product is disclosed, which encompasses commands that, when the computer program product is executed by a computer, prompt the computer to carry out the methods disclosed herein, using a display system as described herein. Moreover, a computer-readable memory is disclosed, on which such a computer program product is stored. The memory may be configured in the form of a non-volatile memory. The computer program product and the memory according to the present disclosure thus also offer the above-described advantages.

The computer program product can be implemented in the form of computer-readable instruction code in any suitable programming language and/or computer language, such as JAVA, C++, C# and/or Python. The computer program product can be stored on a computer-readable memory medium such as a data disk, a removable drive, a volatile or non-volatile memory, or an integrated memory/processor. The instruction code can program the computer or other programmable devices, such as a vehicle control unit, in such a way that the desired functions are carried out. Furthermore, the computer program product can be provided in a network, such as the Internet, from where it can be downloaded by a user as needed. The computer program product can be implemented both by means of software and by means of one or more special electronic circuits, that is, as hardware, or in any hybrid form, that is, by means of software components and hardware components.

Further aspects that may enhance the present disclosure will be apparent from the following description of different exemplary embodiments, which are schematically illustrated in the figures. All of the features and/or advantages that can be derived from the claims, the description or the figures, including design details and spatial arrangements, are contemplated in the present disclosure, both alone and in the various combinations.

DETAILED DESCRIPTION

Elements having identical functions and mechanisms of action are in each case denoted by identical reference numerals in the figures.

Within the scope of the present disclosure, it was found that a desirable compromise between good perceptibility and a low interference or distraction factor can be achieved by being able, if needed, to highlight an existing indication or operating focus again with a low distraction factor. This means that, if a first operating state is present, or the first display means is already in the so-called operating focus, the visualized indication for displaying the operating focus can be changed again, and be intensified, for example. Conventionally, an operating focus is rendered discernible by visually perceptible changes on the selected display means. However, further visual changes are not provided for. As a result, the choice is made between enhanced perceptibility and a higher distraction factor. Accordingly, the display system according to the present disclosure is able to make allowance for both options alike, using an actuating action by the driver and/or a user of the display system.

As used herein, a first operating state may be understood to mean a state in which the first display apparatus ("means") is in the operating focus. The second operating state may be understood to mean a state in which the second display apparatus ("means") is in the operating focus. The second display means may be understood to mean at least one further display apparatus. This means that the display system is not to be considered to be necessarily limited to just two display means. The display system can, for example, include a third or fourth display, wherein the switching apparatus ("means") can accordingly be configured to switch between three, four or more different operating states in each of which only one display is in the operating focus. In such a case, the actuating means is configured to optically highlight the particular operating state by optically changing the particular indication.

In some examples, when the operating unit is in a first operating state, the operating unit is configured for a standard operation of the first display means to be carried out manually, that is, for an operation of the first display means as intended to be carried out. When the operating unit is in the second operating state, the operating unit is configured for a standard operation of the second display means to be carried out manually, that is, for an operation of the second display means as intended to be carried out. A standard operation should be understood to mean not, or not just, the activation and/or deactivation of the particular display means. Changing the particular indication may consequently be understood to mean intensifying a focus effect and/or intensifying the operating focus. Changing the particular indication may be understood to mean changing the shape, the size, the contrast, the color, the brightness and/or the position of the indication. Such a change, however, is only performed at the request of the user or using the actuating means. Until then, the operating focus is only implemented by the basic shape of the optical indication.

In the first operating state, the operating unit may be configured to exclusively or predominantly operate the first display means, and in the second operating state, the operating unit is preferably configured to exclusively or predominantly operate the second display means. This means that it is possible, in the first operating state, for the operating unit or the switching means to be switched back into the second operating state, and simple operating functions may also be possible for the second display means, such as, for example, answering a call displayed on the second display means. In the first operating state, the main functions and/or a majority of the operating functionality of the operating unit, however, are exclusively available for the first display means. The same applies analogously to the second operating state and the second display means.

The first display means and the second display means may each include a screen and/or be configured to represent and/or comprise a screen for displaying digital information. The first display means and the second display means are positioned spaced apart from one another in the three-dimensional space of the vehicle. Preferably, the first display means comprises a physical screen in the vehicle, and the second display means comprises a head-up display. The first display means is in particular designed in the form of an instrument cluster or can comprise an instrument cluster.

The operating unit may include mechanical and/or haptic operating elements in the form of buttons and/or a control wheel, and/or touch-sensitive and/or capacitive operating elements in the form of a touch display or a touch panel. The operating unit may be configured in the form of a steering wheel operating unit and/or an operating unit suitable for installation in a steering wheel of the vehicle. The operating unit may include a cross-design rocker switch for this purpose. At least part of such a cross-design rocker switch and/or at least some of the above-described operating elements can form the actuating means and/or the switching means. The switching means may include direction-based keys, preferably in the form of a cross-design rocker switch, for switching between the different operating states. The actuating means may include an actuating element, which is centrally implemented in the cross-design rocker switch, for optically highlighting the respective operating state or can be configured as part of the direction-based keys of the operating unit and/or of the switching means.

The indicating means may be actuated and/or activated by the operating unit for creating the particular indication. This means that a user, by manually actuating or operating the operating unit, can activate the indicating means so as to create the first or the second indication. The indicating means is thus preferably configured in the form of at least one electric circuit, a digital circuit and/or a corresponding control unit for creating the particular indication. For creating the visually perceptible first indication, the indicating means may be configured in the form of a straight line, directly beneath or above a presently displayed vehicle speed, on the first display means and/or, for creating the visually perceptible second indication, the indicating means may be configured in the form of a straight line, in particular directly beneath or above a presently displayed vehicle speed, on the second display means. Such a line-shaped indication represents an advantageous compromise of sufficient perceptibility and a low interference factor.

In some examples, the operating unit and the switching means may include the same actuating elements. The operating unit may include direction-based actuating elements for operating the display means, wherein these actuating elements, for example in the form of arrow keys, can also be configured for switching between the different operating states.

In some examples, the actuating means in a display system may be configured to optically highlight the first operating state and the second operating state by an illumination of the first indication in the first operating state and/or of the second indication in the second operating state as a result of a manual actuation of the actuating means. This means that is possible, by actuating the actuating means, to illuminate the first indication in the first operating state and to illuminate the second indication in the second operating state. Illuminating may be understood to mean a glowing or a glow effect, that is, a deliberate increase in brightness in an edge region of the particular indication, so as to highlight the indication. Such a change of the indication has sufficiently high perceptibility, without providing too much distraction from the ambient process in road traffic. Experiments within the scope of the present invention have shown that an illumination according to the invention represents a considerably lower interference factor than, for example, a change in size and/or in the position of the indication.

In some examples, the operating unit of a display system may be configured to operate the first display means and/or to operate the second display means by the manual application of a first pressure to the operating unit, and the actuating means is configured to optically highlight the first operating state and the second operating state by the manual application of a second pressure, which is lower than the first pressure, to the actuating means. In this way, a kind of hover feature can be made available, by means of which the operating focus can be communicated more saliently in the manner according to the invention to the user, if needed, by only having to lightly run one's finger over the actuating means or a part of the operating unit, or by only having to briefly place the finger on the actuating means, without building any noteworthy pressure on the actuating means. The actuating means may be positioned in the form of a centrally positioned operating element in a direction-based operating unit, centrally in and/or at the operating unit. Nonetheless, the actuating means can also be positioned in a decentralized manner and/or remotely from a main body of the operating unit, which, for example, comprises the switching means, as part of direction-based arrow keys of the operating unit and/or of the switching means. The actuating means can be designed in the form of a button, a picker wheel or a touch-sensitive or capacitive touch panel.

In some examples, the switching means may include at least one actuating element for switching between the two operating states, and for the actuating means to comprise the same at least one operating element for optically highlighting the operating states, wherein the at least one actuating element is configured to switch between the operating states by the manual application of a first pressure to the at least one actuating element, and to optically highlight the operating states by the manual application of a second pressure, which is lower than the first pressure. The at least one actuating means can accordingly be configured with a so-called Force Touch function and/or a pressure-dependent switch function. Such a function is known, for example, from present smart phones in the touch display as well as in camera systems in a shutter release, where focusing or the taking of photographs is possible as a function of the pressure point of the shutter release. By implementing this in the described display system, the various functional components can be made available in a space-saving, and in particular intuitively usable, manner. The at least one actuating element may be understood to mean a central button or a central operating unit within a rocker switch and/or a rocker switch cross. The at least one actuating element, however, may also be understood the entire rocker switch or the entire rocker switch cross, to include the different actuating elements, in which it is possible to switch between the operating states by means of arrow keys and the first pressure, and the optical highlighting of the particular indication can be triggered by the application of a second, lower pressure to one of the arrow keys or to one of the actuating elements. In other words, it is possible to identify touch contact with exceeding a pressure threshold by a change in the capacitance. When such a touch contact is recognized, the indication can be highlighted, for example. In contrast, a predefined or pre-definable pressure threshold must be exceeded for a change in focus to be carried out.

In some examples, the display system may further include a third display means, which is spaced apart from the first display means and from the second display means, for creating a visually perceptible indication for indicating a switch between the first operating state and the second operating state, for indicating the first operating state and/or for indicating the second operating state. The indication generated by the third display means may be understood as a visually perceptible indication, which a user of the display system may, but does not have to, notice to recognize the present operating state. The indication on the third display means may accordingly be represented relatively freely, that is, large, small, particularly bright, or particularly dark. The third display means can be configured in the form of a screen implemented in the center console. Such a display means also, for example, allows a front-seat passenger to easily recognize the present operating focus or operating state. This can, in particular, be of advantage when the driver is still inexperienced, and the front-seat passenger, serving as a supervising accompanying person, wants to quickly and easily recognize the present operating state. In addition, or as an alternative, the third display means can comprise a screen-independent display means, such as a light band and/or individual LEDs, for example.

In some examples, the display system may include a luminous means for generating a light path from the first display means to the second display means during the switch from the first display means to the second display means, and for generating a light path from the second display means to the first display means during the switch from the second display means to the first display means. Using such a light path and/or a corresponding light guide device, it is possible to direct the attention of the driver or of a user of the display system markedly perceptibly to the activated display means or the display means in the operating focus during the switching process. In this way, it is possible, even if the indication in the display means is not perceived, to prevent situations in which it is not clear to the user whether a switch from the first operating state to the second operating state or from the second operating state to the first operating state has occurred. The light path can be generated directly or indirectly from the first display means to the second display means and from the second display means to the first display means. So as to generate the light path, the luminous means preferably comprises line-shaped luminous elements and/or is at least partially designed as a line-shaped luminous means.

Figure 1:
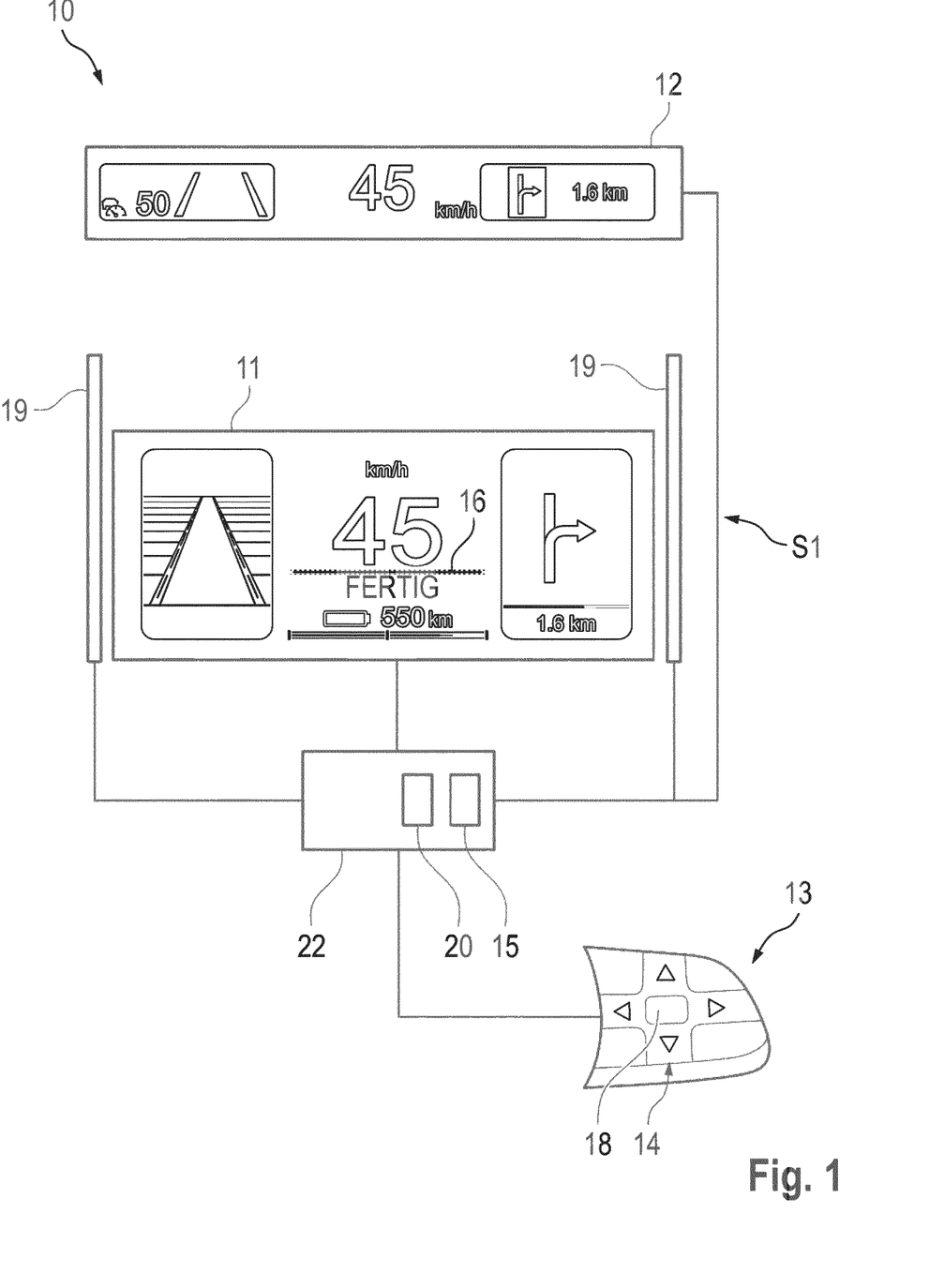
FIG. 1 illustrates a display system in a first operating state, according to some aspects of the present disclosure.
Figure 7:
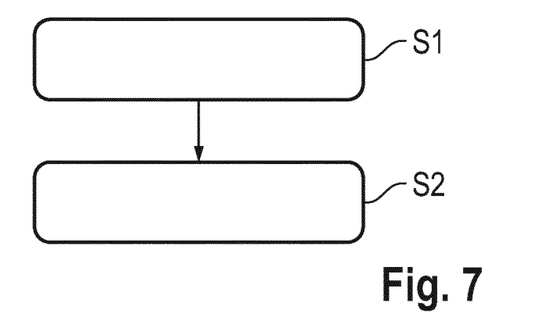
FIG. 7 illustrates a flow chart exemplifying a method, according to some aspects of the present disclosure.

Turning to FIG. 1, the drawing illustrates a display system 10 for a vehicle 50 shown in FIG. 7. The display system 10 comprises a first display means 11 for displaying information at a first location in the vehicle 50, and a second display means 12 for displaying information at a second location, which differs from the first location, in the vehicle 50. The first display means 11 may be configured in the form of an instrument cluster, and the second display means 12 may be configured or visualized in the form of a head-up display. The shown display system 10 furthermore comprises an operating unit 13 for the manual operation of the first display means 11 and the second display means 12, wherein the operating unit 13 comprises a switching means 14 for switching between a first operating state S1, shown in FIG. 1, in which the operating unit 13 is configured for the manual operation of the first display means 11, and a second operating state S2, shown in FIG. 2 and FIG. 3, in which the operating unit 13 is configured for the manual operation of the second display means 12. The operating unit 13 is configured in the form of a cross-design rocker switch of steering wheel 24 or for such a steering wheel 24 of the vehicle 50. The switching means 14 is designed in the form of the arrow keys of the operating unit 13 or comprises these for switching between the two operating states S1, S2. In the present example, the up-arrow key can be used to switch from the first operating state S1 to the second operating state S2, and the down arrow key can be used to switch from the second operating state S2 to the first operating state S1. Accordingly, when switching between the first display means 11 or the first operating state S1 and the second display means 12 or the second operating state S2, a spatial and an iconographic relationship exists between the switching motion (from the bottom to the top, and from the top to the bottom), the key positioning (top and bottom on the cross-design rocker switch or the control island) and the key symbols (up/down arrows/triangles). In this way, the display system can be operated particularly intuitively.

The display means 10 furthermore comprises an indicating means 15 for creating a visually perceptible first indication 16 on the first display means 11 to indicate the first operating state S1 and for creating a visually perceptible second indication 17 on the second display means 12 to indicate the second operating state S2. The indicating means 15 is configured in the form of a digital switching component of a computer 22, wherein the computer 22 is provided in the form of a vehicle control unit. The first indication 16 is represented in the form of a line beneath the vehicle speed. The first operating state S1 shown in FIG. 1 is thus indicated by the first indication 16 in the form of a bar or a line beneath the vehicle speed.

As is shown in FIG. 1, the operating unit 13 furthermore comprises an actuating means 18 for optically highlighting the first operating state S1 and the second operating state S2 by optically changing the first indication 16 in the first operating state S1 and the second indication 17 in the second operating state S2 by a manual actuation of the actuating means 18. In the shown example, the actuating means 18 is implemented centrally in relation to the arrow keys in the form of a central actuating element. FIG. 1 shows a first operating state S1, in which the actuating means 18 is or was manually actuated, and the first indication 16 is optically changed thereby. More precisely, the first indication 16 is changed to the effect that a so-called glow effect of the line is generated, that is, that the first indication 16 or the border around the line is illuminated.

In some examples, which is not shown in a separate figure, the actuating means 18 may include the same two actuating elements as the switching means 14, in the present case being the up-arrow key and the down arrow key, for optically highlighting the operating states S1, S2. In this case, the two actuating elements, that is, the arrow keys, are configured to switch between the operating states S1, S2 by the manual application of a first pressure, and to optically highlight the operating states S1, S2 by the manual application of a second pressure, which is lower than the first pressure. Similarly, an embodiment comprising only a capacitive touch display or touch panel, that is, without arrow keys, is also possible, in which the present operating state S1, S2 can be highlighted by lightly applying a finger and, it is possible to switch between, or switch back and forth between, the two operating states S1, S2 when pressing down more strongly or exceeding a predefined pressure force. Such a touch panel can, for example, be implemented in the center of the rocker switch cross shown in FIG. 1.

FIG. 1 furthermore shows a luminous means 19 in the form of two light strips for generating a light path from the first display means 11, or from a region in the vicinity of the first display means 11, in the direction of the second display means 12 during the switch from the first display means 11 to the second display means 12, and for generating a light path from the second display means 12, or from a region in the vicinity of the second display means 12, in the direction of the first display means 11 during the switch from the second display means 12 to the first display means 11. The two light strips shall only be considered symbolically for a luminous means 19 that visually supports a transition between the two operating states S1, S2 in the vehicle 50 outside the two display means 11, 12, and thus provides a particularly clear understanding of the direction of the switching process to the user. A computer program product 20 is installed on the computer 22 of the shown display system 10, which encompasses commands that, when the computer program product 20 is being executed by the computer 22, prompt the computer to carry out the method described later with reference to FIG. 7, using the display system 10.

Figure 2:
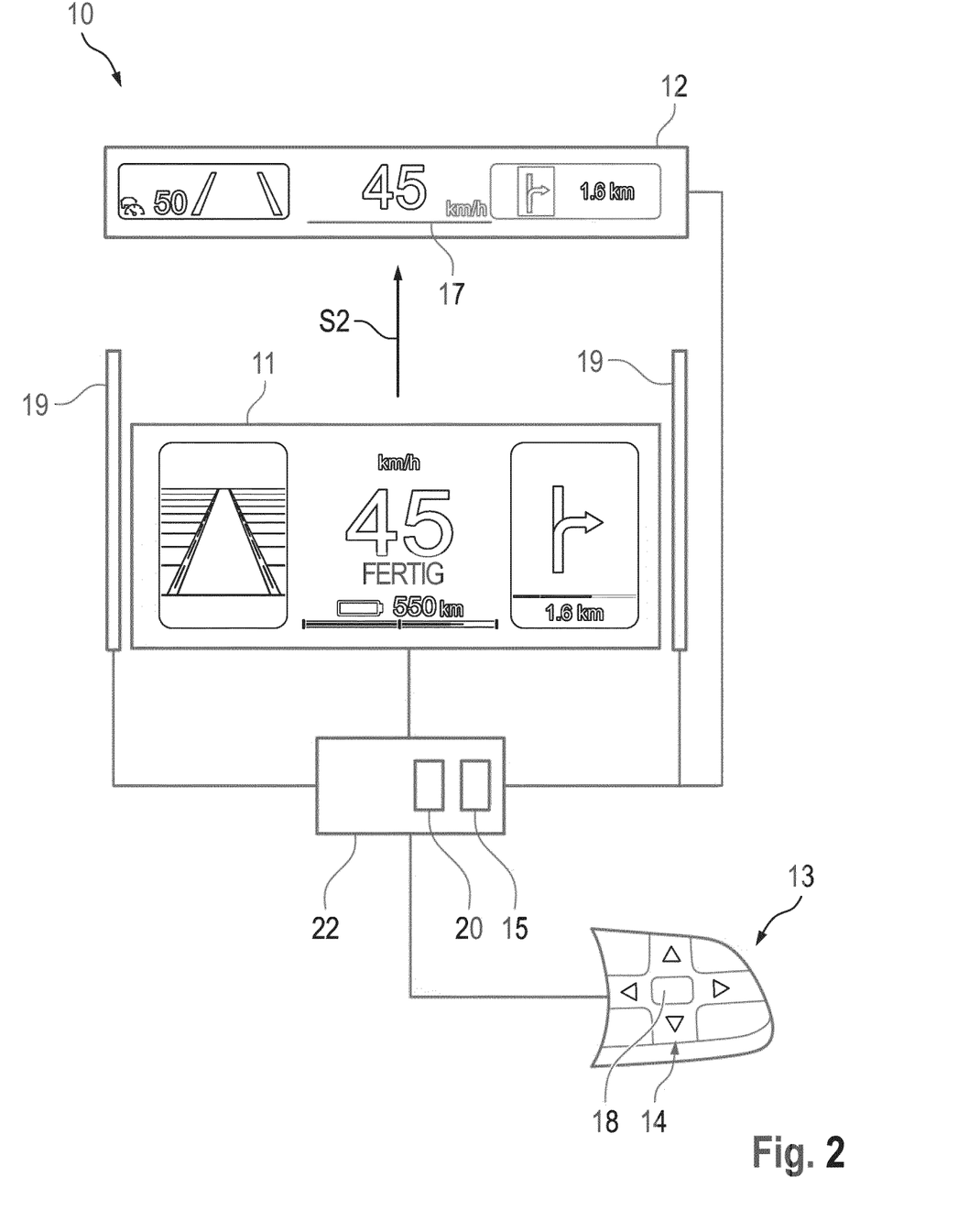
FIG. 2 illustrates a switching process between two operating states in a display system, according to some aspects of the present disclosure.
Figure 3:
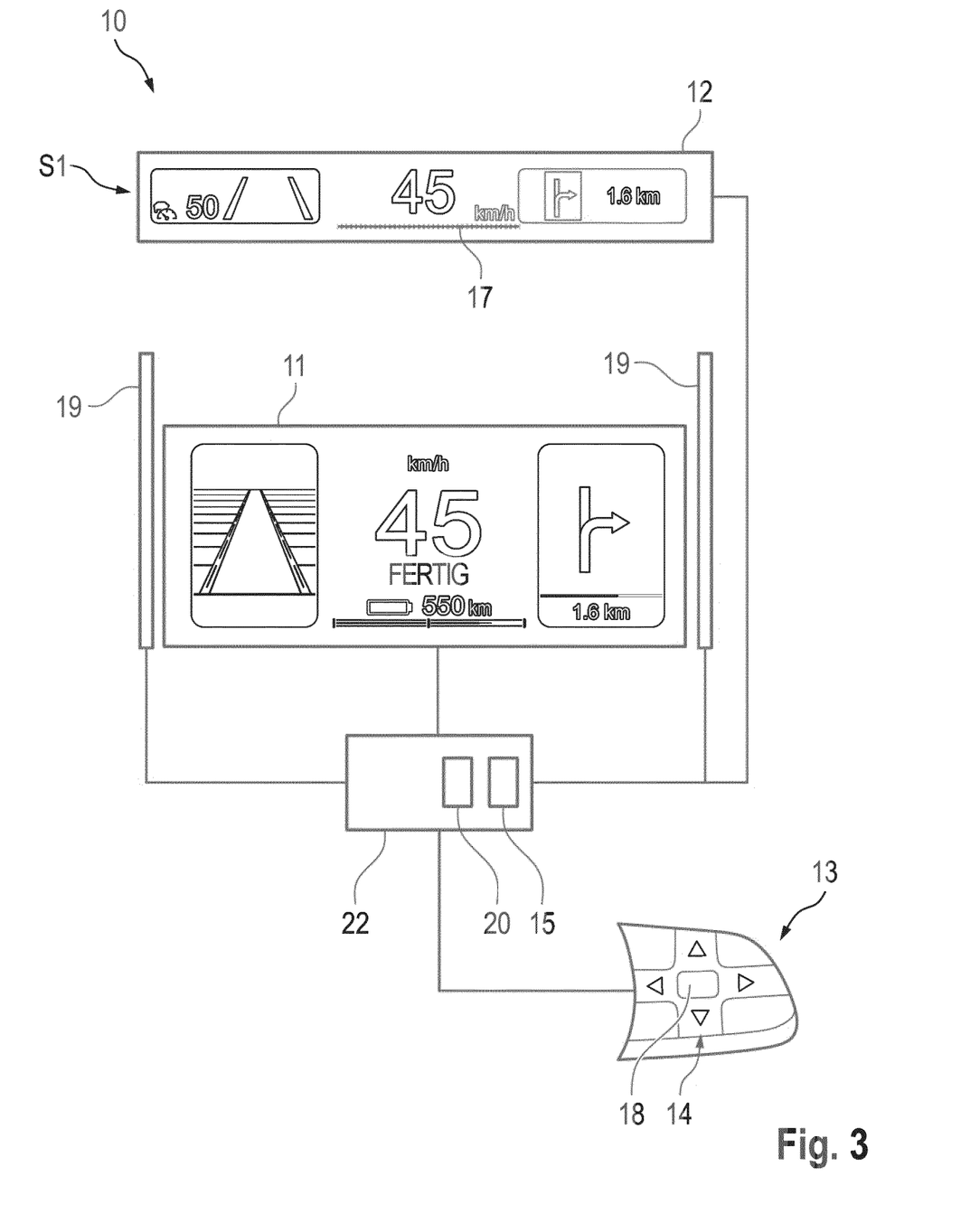
FIG. 3 illustrates a display system in a second operating state, according to some aspects of the present disclosure.

In the display system 10 shown in FIG. 2, a switch was made from the first operating state S1 shown in FIG. 1 to the second operating state S2, in which the operating unit 13 is preferably configured to operate the second display means 12 in the form of the head-up display. In the second operating state S2, the operating focus is thus on the second display means 12. The second indication is or was, however, not yet highlighted. This is or was not carried out until the second operating state S2 according to FIG. 3.

Figure 4:
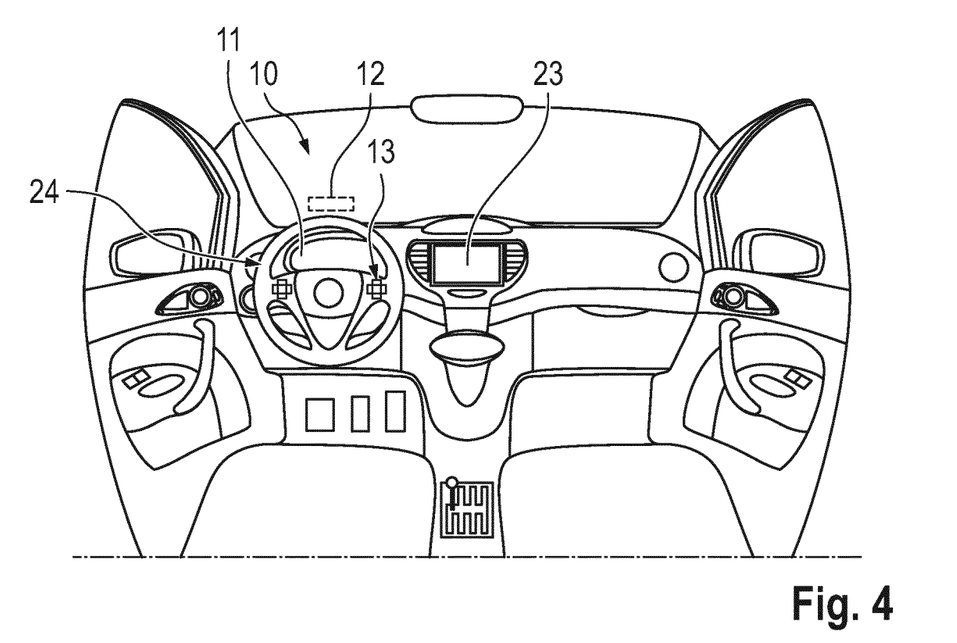
FIG. 4 illustrates a passenger compartment to further detail the display system, according to some aspects of the present disclosure.

FIG. 4 shows a passenger compartment of the vehicle 50 comprising the above-described first display means 11, the second display means 12, and a third display means 23. The third display 23 is designed to be spaced apart from the first display means 11 and spaced apart from the second display means 12 in the form of a display or a screen of the center console and configured to create a visually perceptible indication to indicate a switch between the first operating state S1 and the second operating state S2, to indicate the first operating state S1, and to indicate the second operating state S2. The third display means 23 may thus be understood as a further control function for controlling and/or checking the present operating state S1, S2 or operating focus.

Figure 5:
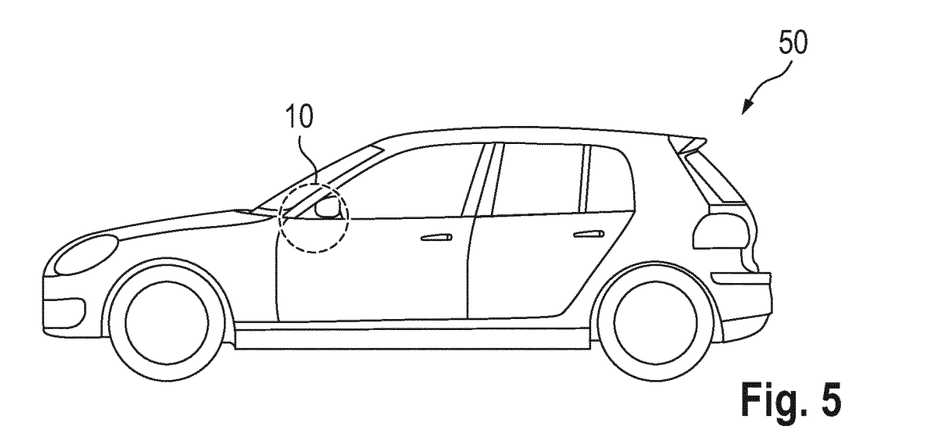
FIG. 5 illustrates a vehicle comprising a display system, according to some aspects of the present disclosure.

FIG. 5 shows a vehicle 50 in the form of a passenger car that, as described above in detail, comprises a display system 10 in which the operating unit 13 and the actuating means 18 are installed at a steering wheel 24 of the vehicle 50.

Figure 6:
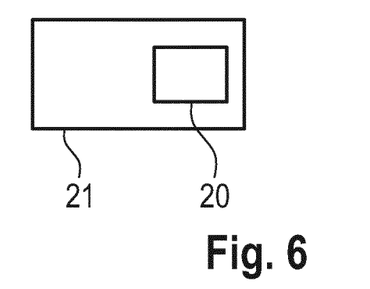
FIG. 6 illustrates a memory means including a computer program product stored thereon, according to some aspects of the present disclosure.

FIG. 6 shows a non-volatile and computer-readable memory means 21, on which a computer program product 20, as was already described with respect to FIG. 1, for carrying out the method described hereafter is stored.

FIG. 7 shows a flow chart to explain a method for optically highlighting different operating states S1, S2 in a display system 10, as described above, of a vehicle 50. In a first step S1, an initial switch is carried out between the first operating state S1 and the second operating state S2, using the indicating means 15, to create a visually perceptible first indication 16 on the first display means 11 to indicate the first operating state S1 or a visually perceptible second indication 17 on the second display means 12 to indicate the second operating state S2. When one of the two operating states S1, S2 is present, and this is visually illustrated by way of an accordingly created indication 16, 17, in a second step S2 the first indication 16 is optically changed in the first operating state S1 for optically highlighting the first operating state S1, or the second indication 17 is optically changed in the second operating state S2 for optically highlighting the second operating state S2. In this way, the first indication 16, in the first operating state S1, and/or the second indication 17, in the second operating state S2, can, for example, each be highlighted by the above-described glow effect.

In addition to the shown embodiments, the invention allows further design principles. As a result, the invention shall not be considered to be limited to the exemplary embodiments described with reference to the figures.

LIST OF REFERENCE SIGNS

10 display system
11 first display means
12 second display means
13 operating unit
14 switching means
15 indicating means
16 first indication
17 second indication
18 actuating means
19 luminous means
20 computer program product
21 memory means
22 computer
23 third display means
24 steering wheel
50 vehicle
S1 first operating state
S2 second operating state

The invention claimed is:
1. A display system for a vehicle, comprising:
a first display for displaying information at a first location in the vehicle;
a second display for displaying information at a second location in the vehicle, situated away from the first location;
an operating unit configured for manual operation of the first display and the second display, the operating unit comprising a switching apparatus for switching between a first operating state for the manual operation of the first display, and a second operating state for the manual operation of the second display; and an indicating apparatus for generating a visually perceptible first indication on the first display to indicate the first operating state, and for generating a visually perceptible second indication on the second display to indicate the second operating state, wherein the operating unit comprises an actuating mechanism for modifying the first indication in the first operating state and the second indication in the second operating state by the manual actuation of the actuating mechanism, wherein modifying the first and second indications comprises optically highlighting the respective indication by modifying at least one visual characteristic.

2. The display system according to claim 1, wherein the operating unit is configured to optically highlight the first operating state and the second operating state by illuminating the first indication in the first operating state and/or the second indication in the second operating state by a manual actuation of the actuating mechanism.

3. The display system according to claim 1, wherein the operating unit is configured to operate the first display and/or to operate the second display by the manual application of a first pressure to the operating unit, and the actuating mechanism is configured to optically highlight the first operating state and the second operating state by the manual application of a second pressure, which is lower than the first pressure.

4. The display system according to claim 1, wherein the switching apparatus comprises at least one actuating element for switching between the two operating states, and the actuating mechanism comprises the same at least one operating element for optically highlighting the operating states.

5. The display system according to claim 4, wherein the at least one actuating element is configured to switch between the operating states by the manual application of a first pressure to the at least one actuating element, and to optically highlight the operating states by the manual application of a second pressure, which is lower than the first pressure.

6. The display system according to claim 1, further comprising a third display, configured to be spaced apart from the first display and from the second display, for generating a visually perceptible indication to indicate a switch between the first operating state and the second operating state.

7. The display system according to claim 1, further comprising a luminous apparatus for
generating a light path from the first display to the second display during the switch from the first display to the second display, and
generating a light path from the second display to the first display during the switch from the second display to the first display.

8. A vehicle, comprising a display system configured within a steering wheel, the display system comprising:
a first display for displaying information at a first location in the vehicle;
a second display for displaying information at a second location in the vehicle, situated away from the first location;
an operating unit configured for manual operation of the first display and the second display, the operating unit comprising a switching apparatus for switching between a first operating state for the manual operation of the first display, and a second operating state for the manual operation of the second display; and an indicating apparatus for generating a visually perceptible first indication on the first display to indicate the first operating state, and for generating a visually perceptible second indication on the second display to indicate the second operating state, wherein the operating unit comprises an actuating mechanism for modifying the first indication in the first operating state and the second indication in the second operating state by the manual actuation of the actuating mechanism, wherein modifying the first and second indications comprises optically highlighting the respective indication by modifying at least one visual characteristic.

9. The vehicle according to claim 8, wherein the operating unit is configured to optically highlight the first operating state and the second operating state by illuminating the first indication in the first operating state and/or the second indication in the second operating state by a manual actuation of the actuating mechanism.

10. The vehicle according to claim 8, wherein the operating unit is configured to operate the first display and/or to operate the second display by the manual application of a first pressure to the operating unit, and the actuating mechanism is configured to optically highlight the first operating state and the second operating state by the manual application of a second pressure, which is lower than the first pressure.

11. The vehicle according to claim 8, wherein the switching apparatus comprises at least one actuating element for switching between the two operating states, and the actuating mechanism comprises the same at least one operating element for optically highlighting the operating states.

12. The vehicle according to claim 11, wherein the at least one actuating element is configured to switch between the operating states by the manual application of a first pressure to the at least one actuating element, and to optically highlight the operating states by the manual application of a second pressure, which is lower than the first pressure.

13. The vehicle according to claim 8, further comprising a third display, configured to be spaced apart from the first display and from the second display, for generating a visually perceptible indication to indicate a switch between the first operating state and the second operating state.

14. The vehicle according to claim 8, further comprising a luminous apparatus for
generating a light path from the first display to the second display during the switch from the first display to the second display, and
generating a light path from the second display to the first display during the switch from the second display to the first display.

15. A method for optically highlighting different operating states in a display system of a vehicle, comprising:
displaying, via a first display, information at a first location in the vehicle;
displaying, via a second display, information at a second location in the vehicle, situated away from the first location;
switching, via a switching apparatus of an operating unit configured for manual operation, between a first operating state for the manual operation of the first display, and a second operating state for the manual operation of the second display;
generating, via an indicating apparatus, a visually perceptible first indication on the first display to indicate the first operating state, and generating a visually perceptible second indication on the second display to indicate the second operating state; and modifying, via an actuating mechanism of the operating unit, the first indication in the first operating state and the second indication in the second operating state by the manual actuation of the actuating mechanism, wherein modifying the first and second indications comprises optically highlighting the respective indication by modifying at least one visual characteristic.

16. The method according to claim 15, further comprising optically highlighting, via the operating unit, the first operating state and the second operating state by illuminating the first indication in the first operating state and/or the second indication in the second operating state by a manual actuation of the actuating mechanism.

17. The method according to claim 15, further comprising operating, via the operating unit, the first display and/or the second display by the manual application of a first pressure to the operating unit, and the actuating mechanism is configured to optically highlight the first operating state and the second operating state by the manual application of a second pressure, which is lower than the first pressure.

18. The method according to claim 15, further comprising:

switching, via at least one actuating element of the switching apparatus, between the two operating states, and the actuating mechanism comprises the same at least one operating element for optically highlighting the operating states; and switching, via the at least one actuating element of the switching apparatus, between the operating states by the manual application of a first pressure to the at least one actuating element, and optically highlighting the operating states by the manual application of a second pressure, which is lower than the first pressure.

19. The method according to claim 15, further comprising generating, via a third display, configured to be spaced apart from the first display and from the second display, a visually perceptible indication to indicate a switch between the first operating state and the second operating state.

20. The method according to claim 15, further comprising:

generating, via a luminous apparatus, a light path from the first display to the second display during the switch from the first display to the second display; and generating, via the luminous apparatus, a light path from the second display to the first display during the switch from the second display to the first display.

* * * * *